Oct. 28, 1941.  J. P. JOHNSON  2,260,809

SEAL FOR ROTARY PUMPS

Filed March 18, 1938

INVENTOR.
JAMES P. JOHNSON
BY
ATTORNEY.

Patented Oct. 28, 1941

2,260,809

UNITED STATES PATENT OFFICE 2,260,809

SEAL FOR ROTARY PUMPS

James P. Johnson, Shaker Heights, Ohio, assignor, by mesne assignments, to Pump Engineering Service Corporation, Cleveland, Ohio, a corporation of Ohio Application March 18, 1938, Serial No. 196,694

1 Claim. (Cl. 308—36.2)

This invention relates to seals for rotating members and more particularly to an improved seal for the rotatable drive shaft of a rotary fluid pump.

It is therefore, an object of the present invention to provide a seal which is effectively maintained by the pressure of the fluid within the pump.

Another object of the present invention is to provide means for preloading the seal so that it is effective irrespective of the pressure within the pump.

Another object of the present invention is to provide means by which so much of the fluid adjacent the seal is diverted as to maintain the effectiveness of the seal with the minimum amount of pressure whereby the wear between the relatively movable parts is reduced to a minimum and the efficiency of the pump increased.

Another object of the present invention is to so arrange the relatively movable parts of the pump that, during priming or testing of the pump, should the seal become ineffective, the loss of vacuum will be negligible and therefore, will not affect the efficiency of the pump.

A further object of the present invention is to provide a yieldable mounting for the seal to compensate for any misalignment of the rotatable drive shaft without affecting the efficiency of the seal.

With the objects above indicated, and other objects hereinafter explained in view, my invention consists in the construction and combination of elements hereinafter described and claimed.

Referring to the drawing.

Figure 1:
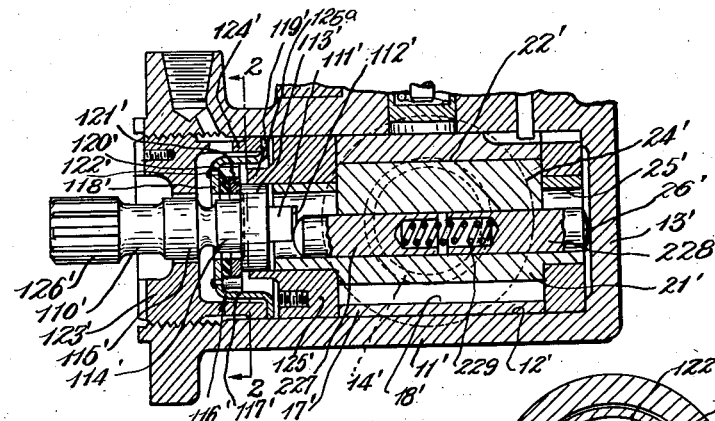
Figure 1 is a longitudinal sectional view of a rotary type pump showing the seal construction embodying the invention.

In the drawing, I have shown seal constructions embodied in rotary pumps and their adaptation in this connection is of material importance but the invention is not to be so restricted as its adaptation to other structures having similar characteristics will be, at once, recognized by those skilled in the particular art.

Inasmuch as the structural features of the pumps form no part of the present invention except as they may be included in such combinations, a detailed description of the pump unit will not be hereafter set forth but reference should be had to my prior Patent No. 2,202,913 and my copending application, Serial No. 196,693, filed March 18, 1938, for a clearer understanding if found necessary, wherein such structures are claimed.

Figure 2:
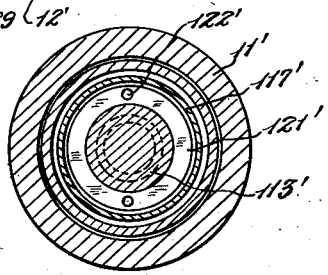
Figure 2 is a transverse sectional view taken on line 2—2 in Figure 1 and showing details of the seal.

In the construction illustrated in Figures 1 and 2 the housing is indicated by 11' and has an axial bore 12' extending inwardly from one end thereof and which is closed at its other end by an integral end wall 13'. The housing 11' is provided with an interiorly screwthreaded opening 14' on one side thereof, which communicates with the axial bore 12', while the opposite side of the housing is provided with a similar screwthreaded opening (not shown) which likewise communicates with the bore 12'. These screwthreaded openings are adapted to be connected, one with the fuel supply and the other with the carburetor which supplies the fuel to the motor, and the respective openings will be connected in the manner herein stated, depending on the direction of rotation of the fuel pump.

A liner 17' is positioned within the axial bore 12' and is provided with an axial bore 18' which is eccentric to the axial bore 12'. The liner 17' has oppositely disposed transversely extending openings (not shown) communicating respectively with the screwthreaded openings in the housing so as to provide communication with the interior of the bore 18', the latter constituting a circular chamber.

A rotor 21' is eccentrically positioned within the bore 18' and has a running engagement with the inner peripheral wall of the chamber at 22', which separates the screwthreaded openings. The rotor 21' is provided with tubular extensions which extend axially thereof, and are suitably mounted for rotation in spaced bearings disposed within the housing. The body portion of the rotor is provided with angularly disposed slots, positioned longitudinally and within which are slidably mounted a plurality of blades 24', the blades being coextensive with the body portion of the rotor. The outer ends of the blades are adapted for engagement with the inner peripheral wall of the chamber, while the inner ends of the blades extend inwardly within the axial bore 25' provided in the rotor. A roller member 26' is freely positioned within the bore 25' and is adapted for engagement with the inner ends of the blades to maintain the latter in spaced relation.

The modification of seal construction embodied herein, comprises a drive shaft 110' disposed coaxially of the rotor 21' and having at its inner end a transversely extending projection 111' which is disposed in aligned recesses 112' provided in the adjacent tubular extension. The projection 111' is mounted for slight axial movement within the recesses 112' but connected thereto in a manner to insure rotation of the rotor 21'. Outwardly of the projection 111' is an enlarged circular portion 113' which is disposed within the flanged extension of the bearing opening in the adjacent bearing and has a close running fit therewith. The inner face of the circular portion 113' is spaced slightly from the adjacent end of the rotor extension but is movable axially into engagement therewith for a purpose to be later described. The shaft 110' has a reduced portion 114' outwardly of the circular portion 113' and of relatively smaller diameter and a second enlarged circular portion 115' substantially midway of its ends.

A seal supporting member 116', preferably of steel material, has an annular wall 117' which encircles the flanged extension of the adjacent bearing and an inwardly extending peripheral flange 118' arranged in spaced relation with respect to the adjacent end of the bearing flange. The opposite end of the supporting member 116' has an outwardly extending peripheral flange 119' which rests upon the adjacent portion of the bearing insert and is of a diameter such as to permit it to be slidably mounted within the bore 12' of the housing. Positioned upon the inner face of the inner peripheral flange 118' of supporting member 116' is a flexible disc 120', of any suitable material, such as the commercially available products including the rubber composition commonly known as "Duprene," together with fabric material used therewith. Positioned upon the inner face of the flexible disc 120' is a metal disc 121' which has its inner face spaced a suitable distance from the adjacent end of the bearing flange. The metal and flexible discs and flange 118' are secured in any suitable manner for their intended function but in the present instance, a plurality of pins 122' have their outer ends secured to the flange 118' and their inner ends projecting freely through aligned openings in the flexible and metal discs. The metal disc 121' and the enlarged portion 113' of the drive shaft are so arranged that their adjacent marginal portions are in running engagement and their contacting surfaces being machined, produce a seal against the escape of fluid by reason of the pressure existing in the pump during its operation. The flexible and metal disc arrangement provides another advantage in that it insures a proper seal even though the drive shaft 110' is in slight misalignment. This is made possible by the flexible disc 120' yielding slightly without causing any misalignment between the contacting portions of the metal disc 121' and the enlarged portion 113'.

The construction is such that when the pump is vacuum tested by the interior of the pump being placed under vacuum, the enlarged portion 113' of the drive shaft is moved inwardly axially into contact with the adjacent end of the rotor and because of the close running fit between the peripheral surface of the enlarged portion 113' and the inner surface of the bearing opening an efficient seal is provided so that the loss of vacuum is inconsequential.

The plug 123' which closes the outer end of the bore 12' has an annular flange 124' which is adapted to engage the flange 119' on the supporting member and by screwing the plug inwardly the flange 119' is secured in rigid position. The plug 125' has an end wall 125a provided with an axial opening to receive the enlarged portion 113' of the drive shaft. The outer end of the drive shaft 110' has a gear 126' formed thereon by which it is adapted for driving connection with the motor of the aircraft or other means.

If in this type of pump, which is a low pressure type, the pressures developed should be insufficient to effectively maintain the seal, a means may be adapted for creating a positive pressure on the seal elements which will function independently of the fluid pressure and also in conjunction therewith. A simple and expedient way consists of dividing the roller member 26' centrally into two sections 227 and 228 and providing aligned bores in their adjacent ends within which a coiled spring 229 is disposed. The spring exerts an outward thrust upon the sections whereby the outer end of the section 228 abuts the end wall 13' of the housing and the outer end of the section 227 abuts the transverse extension 111' thereby maintaining the flange 113' in sealing engagement with the disc 121' independently of the fluid pressure. A spring of the desired tension should be selected which will exert a force sufficient to maintain the seal.

The operating parts of the pump are, of course so arranged that the pump may be operated in either direction without the necessity of rearrangement thereof, which is quite advantageous in view of the fact that different types of motors operate in different directions. It is not necessary, therefore, to change the position of the pump, irrespective of the direction of rotation of the motor used.

Figure 3:
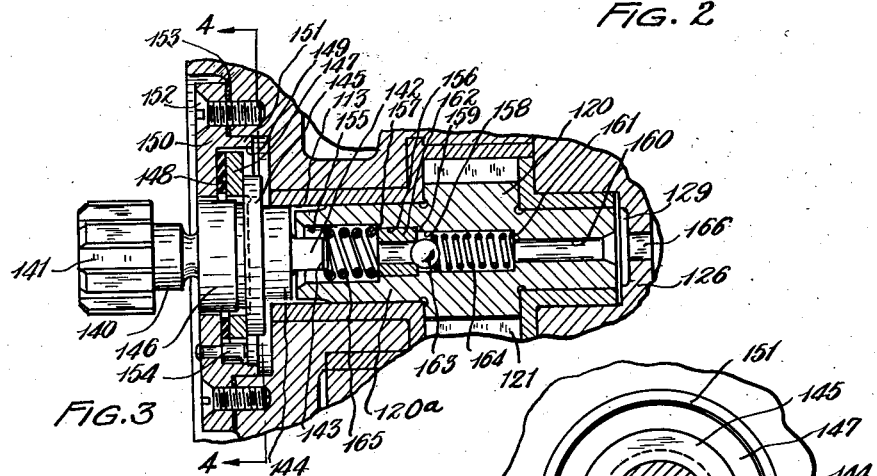
Figure 3 is a longitudinal fragmentary sectional view of a gear type of rotary pump showing a modified seal construction but embodying the same invention.
Figure 4:
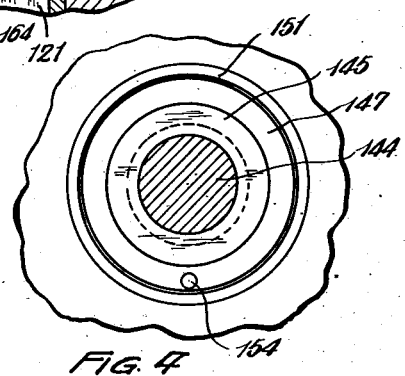
Figure 4 is a transverse sectional view taken on line 4—4 in Figure 3 and showing details of the seal.

In Figures 3 and 4 a still further modification of the seal is illustrated and a detailed description of the pump and its operation will be found in my above referred to patent. In this type of gear pump, the pumping gears 120 and 121 are in mesh and rotation of the latter creates a suction at the inlet opening thereby drawing the fluid from its source into the inlet side of the meshing gears where it is taken up in the well known manner and conveyed therearound to the outlet side where the fluid is discharged under high pressure. From the outlet side of the pumping gear the fluid is discharged from the outlet opening and conveyed by suitable conduit to the instrumentalities which it is to actuate.

The gear 120 may be driven by any suitable means but preferably a drive shaft 140 of steel is provided which has a splined outer end 141 adapted for connection with the aircraft engine for positive rotation therefrom. The shaft extends through the end of the housing and has a transverse projection 142 upon its inner end which slidably fits within transversely aligned recesses 143 provided in the adjacent end of the extension 121. Outwardly of the projection 142 the shaft 140 is provided with an enlarged circular portion 144 which is disposed within and has a close running fit with the inner peripheral surface of the bearing material adjacent the opening 113. The inner face of the enlarged circular portion 144 is spaced slightly from the outer end of the extension 120a of gear 120 and is thereby limited in its movement axially in that direction.

Outwardly of the portion 144 the shaft 140 is provided with a circumferential flange 145 of larger diameter than that of the portion 144 and the outer face of the flange is machined smooth and true. About midway of its ends the shaft 140 is provided with an enlarged circular portion 146 of smaller diameter than that of the flange 145 and positioned outwardly of the latter. An inherently rigid disc 147 of bronze or other bearing material, is disposed outwardly of the flange 145 and has a central opening through which the enlarged portion 146 of the drive shaft freely extends. A flexible disc 148 of the above referred to Duprene and fabric or other similar material, is disposed outwardly of the disc 147 and housed within a circular recess 149 provided upon the inner side of an end plate 150. The end plate 150 has an inwardly extending circular flange 151 adapted to fit closely within a recessed opening in the adjacent end of the housing and is detachably connected to the latter by a plurality of screws 152. A gasket 153 is disposed at the outer marginal portion between the end plate 150 and the adjacent portion of the housing to provide a fluid tight joint. The discs 147 and 148 may be secured to the end plate 150 in any suitable manner to prevent rotation and in the present instance I have shown aligned openings to receive the free end of a pin 154 which has its opposite end rigidly connected to the end plate as more clearly shown in Figure 4. As many of these pins may be employed as desired, so as to maintain the discs in proper relation. The machined surface of the flange 145 has a running engagement with the adjacent surface of the disc 147 and the flange is forced into sealing engagement with the disc 147 by the pressure created within the pump housing during operation. The flexible disc 148 is provided to compensate for any misalignment of the drive shaft 140 without affecting the efficiency of the seal contact between the flange 145 and disc 147.

It will be appreciated that in view of the fact that the pressure within the pump increases tremendously and in direct proportion to the rotation of the gears, it would be unsafe and injurious to the elements forming the seal if they were subjected to such high pressures for any length of time. Furthermore, the effectiveness of the seal can be maintained with relatively less pressure and to accomplish this result means is provided for bleeding the oil from adjacent the seal and returning it to the inlet side of the pump. In the present instance the drive gear is provided with an axial opening extending entirely through it and its extensions. This opening is of large diameter at 155 and communicates with a portion 156 of smaller diameter at its inner end forming a shoulder 157. The opening has a portion 158 of smaller diameter than the portion 156 thus providing a shoulder 159. The opening has a further portion 160 of smaller diameter than the adjacent portion 158 thereby providing a shoulder 161 at its inner end, the outer end communicating with the adjacent end of the bore 129 in the cover 126. A tubular member 162 is secured within the portion 156 of the opening and seats against the shoulder 159, its inner end providing a valve seat. A ball valve member 163 is movably mounted in the portion 158 of the opening and engageable with the valve seat. A coiled spring 164 has one end engageable with the ball valve member 163 and its other end engageable with the shoulder 161 to normally maintain the valve member in engagement with its valve seat. A second coiled spring 165 is disposed within the portion 155 of the opening and has one end in engagement with the transverse projection 142 on the inner end of the drive shaft while its opposite end is in engagement with the shoulder 156 and the adjacent end of the tubular member 159 for normally urging the flange 145 into sealing engagement with the disc 147.

The tension of the coiled springs is predetermined so that the pressure exerted by the spring 165 and the pressure of the oil retained adjacent the seal is the effective sealing pressure, the excess oil passing through the opening 155, the opening in the tubular member 162 thereby unseating the valve member 163 and permitting flow through the portions 158 and 160 of the opening where it discharges into the bore 129 of the cover. The cover 126 is provided with a passageway 166 communicating with the bore 129 and the inlet opening so that the oil discharged into the bore 129 is returned to the inlet opening.

It will be noted that while different modifications of seal structures are shown they are all made effective by the same function and thereby each embodies the same broad invention. The built up pressure of the fluid within the pump exerts a force to maintain a proper seal and where this built up pressure is greater than that required to maintain the seal, the excess fluid is diverted away from the seal, and in the case of pumps, into the inlet side.

While I have described certain preferred embodiments of my invention it is to be understood that I am not to be limited thereto inasmuch as changes and modifications may be resorted to without departing from the spirit of the invention as defined in the appended claim.

What is claimed is:

In a fluid pump bearing and fluid pressure seal assembly, a supporting housing, a rotary drive shaft carried thereby, means inwardly of said housing defining a single horizontal bearing for said shaft, said bearing being limited to a length equal only to a small fraction of the total length of said shaft within said housing and providing for a limited axial movement of said shaft as well as a limited mis-alignment of said shaft relative to said bearing, a radially extending flange functioning to provide an axial thrust bearing surface displaced axially outwardly of said horizontal bearing, a bearing ring arranged to engage said thrust bearing surface, and supporting means arranged to be fastened to said housing for supporting said bearing ring, a compressible ring interposed between said bearing ring and said supporting means providing for said axial adjustment and said mis-alignment for maintaining sealed contact between said axial thrust surface and said bearing ring, pin means passing through said bearing ring and fixed relative to said supporting means for limiting the turning of said bearing ring in response to rotation of said shaft, and spring means normally urging said axial thrust bearing surface into engagement with said ring.

JAMES P. JOHNSON.